United States Patent
Chang

(10) Patent No.: US 6,488,256 B1
(45) Date of Patent: Dec. 3, 2002

(54) ADJUSTABLE MOUNTING BRACKET FOR A POWER HAND TOOL

(76) Inventor: Wen-Chi Chang, No. 31-18, Mintsu Rd., Shenkang Hsiang, Taichung Hsien (TW)

( * ) Notice: Subject to any disclaimer, the term of this patent is extended or adjusted under 35 U.S.C. 154(b) by 0 days.

(21) Appl. No.: 09/669,086

(22) Filed: Sep. 25, 2000

(51) Int. Cl.$^7$ .................................................. F16M 9/00
(52) U.S. Cl. ........................ 248/670; 248/678; 248/680; 248/346.03; 248/346.07
(58) Field of Search ........................... 248/678, 346.03, 248/346.05, 346.07, 670, 675, 674, 680, 500, 154; 83/477.2, 477.1, 488, 483, 581, 469, 574, 468.7; 30/371; 269/16

(56) References Cited

U.S. PATENT DOCUMENTS

| | | | | |
|---|---|---|---|---|
| 2,765,820 A | * | 10/1956 | Perkins | 83/574 |
| 4,807,506 A | * | 2/1989 | Audet | 83/486.1 |
| 4,977,938 A | * | 12/1990 | Greeson | 144/154.5 |
| 5,333,385 A | * | 8/1994 | Chou | 30/371 |
| 5,647,420 A | * | 7/1997 | Michell | 144/286.1 |
| 5,815,932 A | * | 10/1998 | Presher et al. | 30/373 |
| 5,884,681 A | * | 3/1999 | Nickles | 144/329 |
| 6,116,304 A | * | 9/2000 | Wilson et al. | 144/154.5 |

* cited by examiner

*Primary Examiner*—Korie Chan
(74) *Attorney, Agent, or Firm*—Dellett & Walters

(57) ABSTRACT

An adjustable mounting bracket includes two frames juxtaposed to slide on each other and attached by nuts and bolts. Each of the two frames is essentially U-shaped with an internal T-shaped opening. The T-shaped opening is formed by a shoe plate formed between the end plate and two side plates. Slots and holes in the shoe plate are used to connect the two frames together and adjust the central working space for use with either a circular saw or a router. Slots in the shoe plate in conjunction with locking pieces are used to attach the power hand tool to the mounting bracket. The length of the mounting bracket is adjustable to be suitable for power hand tools such as a circular saw or a router that have different sizes. Consequently, the user only needs to use a single mounting bracket so material and cost are saved. Furthermore, the two frames of the present invention are identical so that the frames are easy to be manufactured.

1 Claim, 5 Drawing Sheets

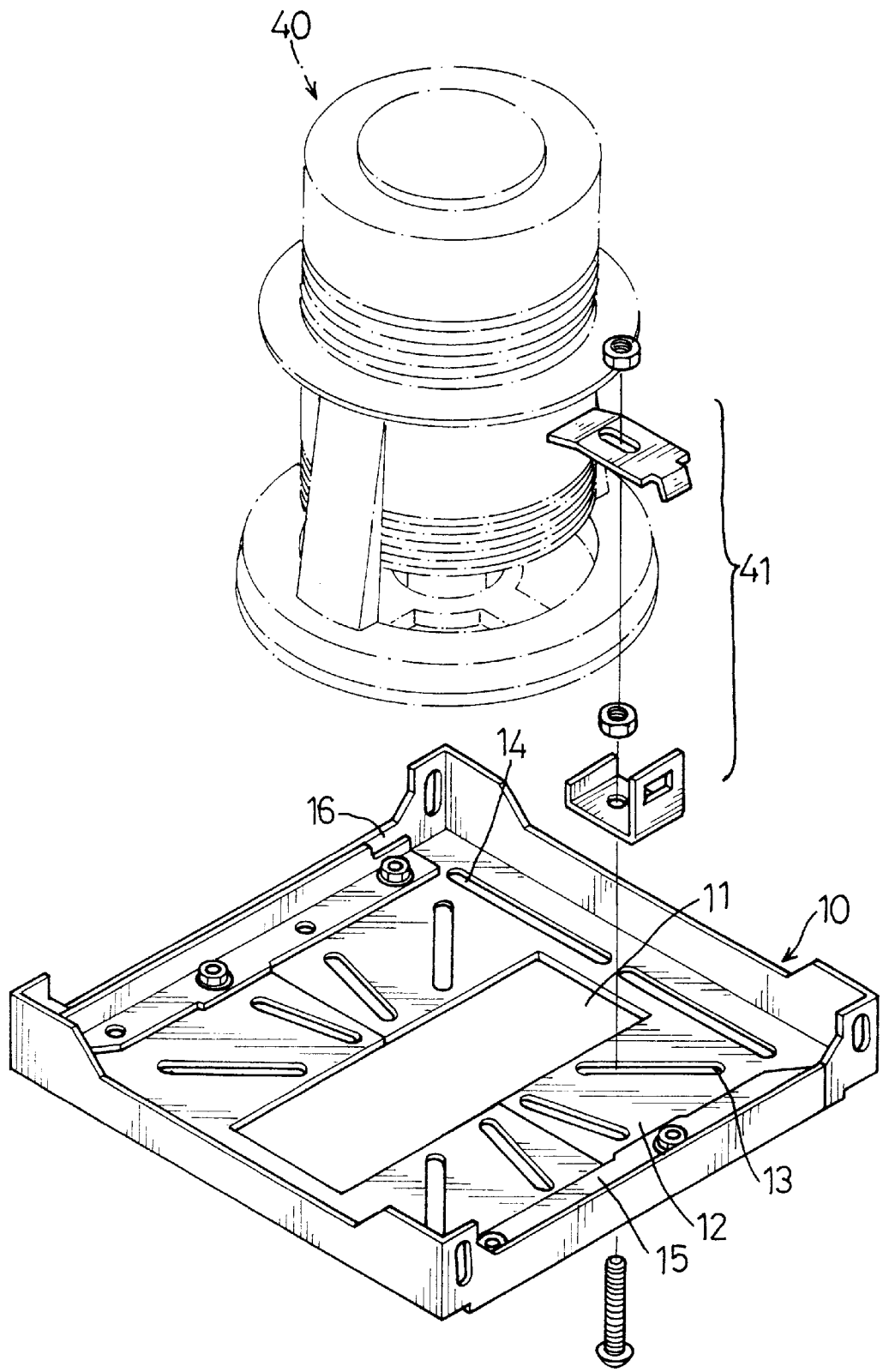
F I G. 5

ADJUSTABLE MOUNTING BRACKET FOR A POWER HAND TOOL

BACKGROUND OF THE INVENTION

1. Field of the Invention

The present invention relates to a mounting bracket for a power hand tool, and more particularly to an adjustable mounting bracket to convert a power hand tool to a table mounted tool. The mounting bracket in accordance with the present invention has a frame that can be adjusted to accommodate various types and sizes of power hand tools such as circular saws or routers.

2. Description of Related Art

In woodworking, circular saws and routers are frequently mounted in a table configuration to make precise cuts. The conventional mounting bracket for a power hand tool is configured to support a specific type and size tool. Consequently, the user must prepare a separate mounting bracket to mount a circular saw and another to mount a router. Different brands of power hand tools have different sizes and mounting configuration from one another. Consequently, the mounting bracket must be replaced when a power hand tool breaks and must be replaced by a new tool. Replacing the mounting bracket takes a lot of time and wastes time and material.

The present invention has arisen to mitigate and/or obviate the disadvantages of the conventional mounting bracket for a power hand tool.

SUMMARY OF THE INVENTION

In accordance with one aspect of the present invention, an adjustable mounting bracket for a power hand tool comprises two U-shaped frames juxtaposed to slide on and securely connected to each other by nuts and bolts. The length of the mounting bracket is adjusted to be suitable for various power hand tools such as a circular saw or a router of different sizes. The adjustable mounting bracket for a power hand tool includes multiple locking pieces for securely attaching the power hand tool to the mounting bracket. The mounting bracket and the attached power hand tool are attached to the bottom of a worktable so that the tool protrudes through the upper surface of the table.

Further benefits and advantages of the present invention will become apparent after a careful reading of the detailed description with appropriate reference to the accompanying drawings.

BRIEF DESCRIPTION OF THE DRAWINGS

FIG. 5 is an operational perspective view of the adjustable mounting bracket for a power hand tool in FIG. 1, wherein a router is attached to the mounting bracket.

DETAILED DESCRIPTION OF THE INVENTION

Figure 1:
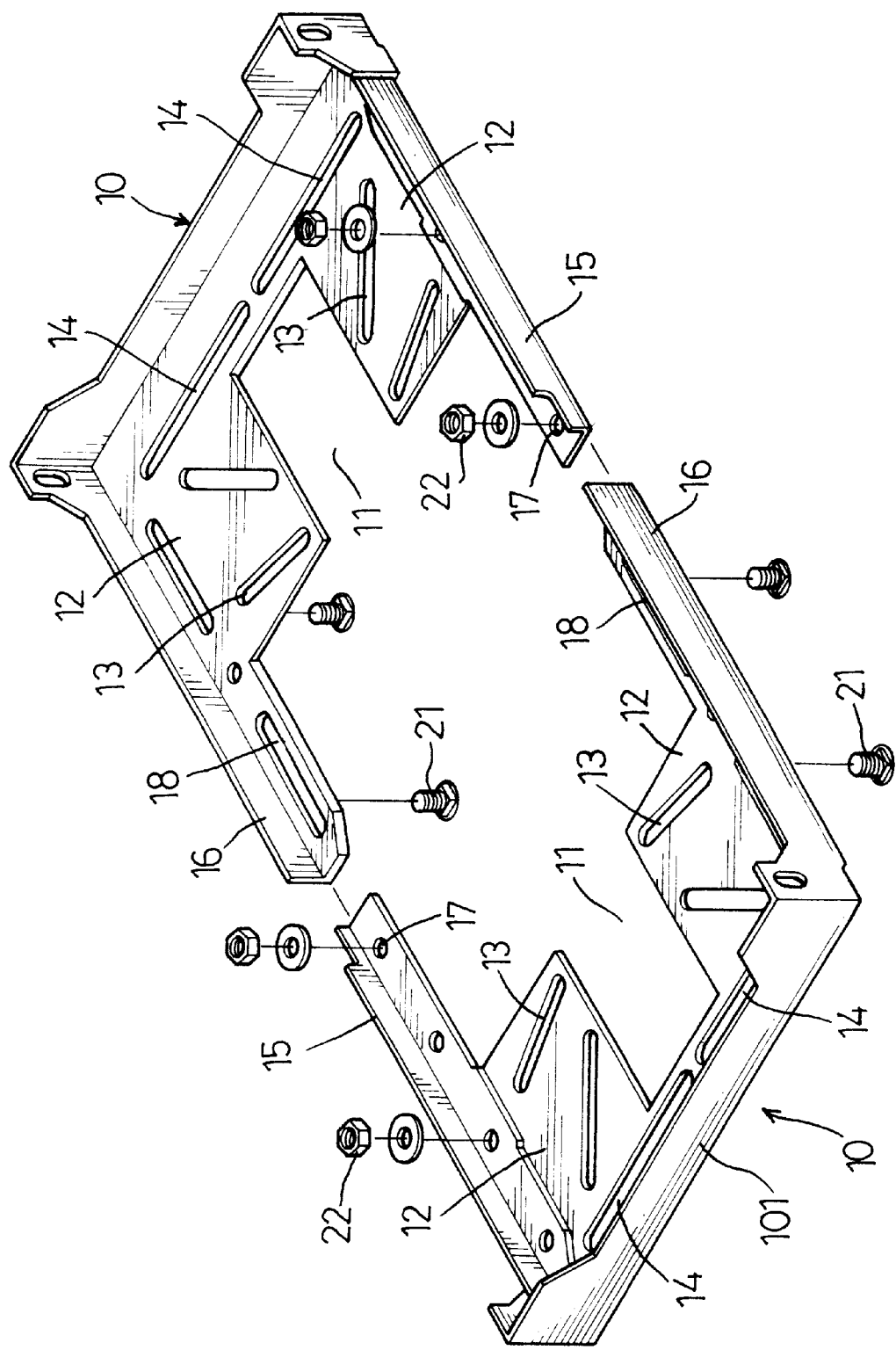
FIG. 1 is an exploded perspective view of an adjustable mounting bracket for a power hand tool in accordance with the present invention.
Figure 2:
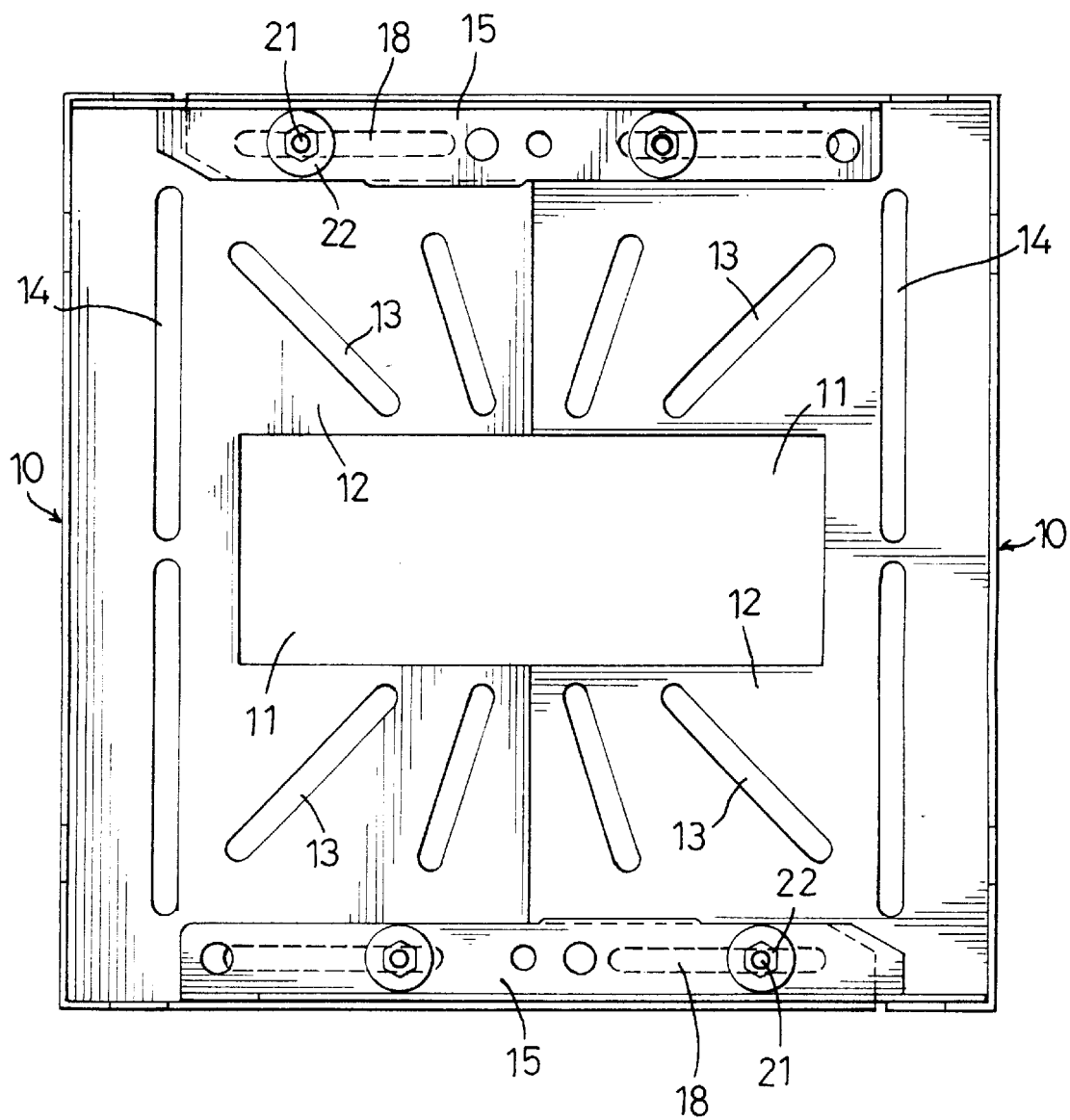
FIG. 2 is a top plan view of the adjustable mounting bracket for a power hand tool in FIG. 1.
Figure 3:
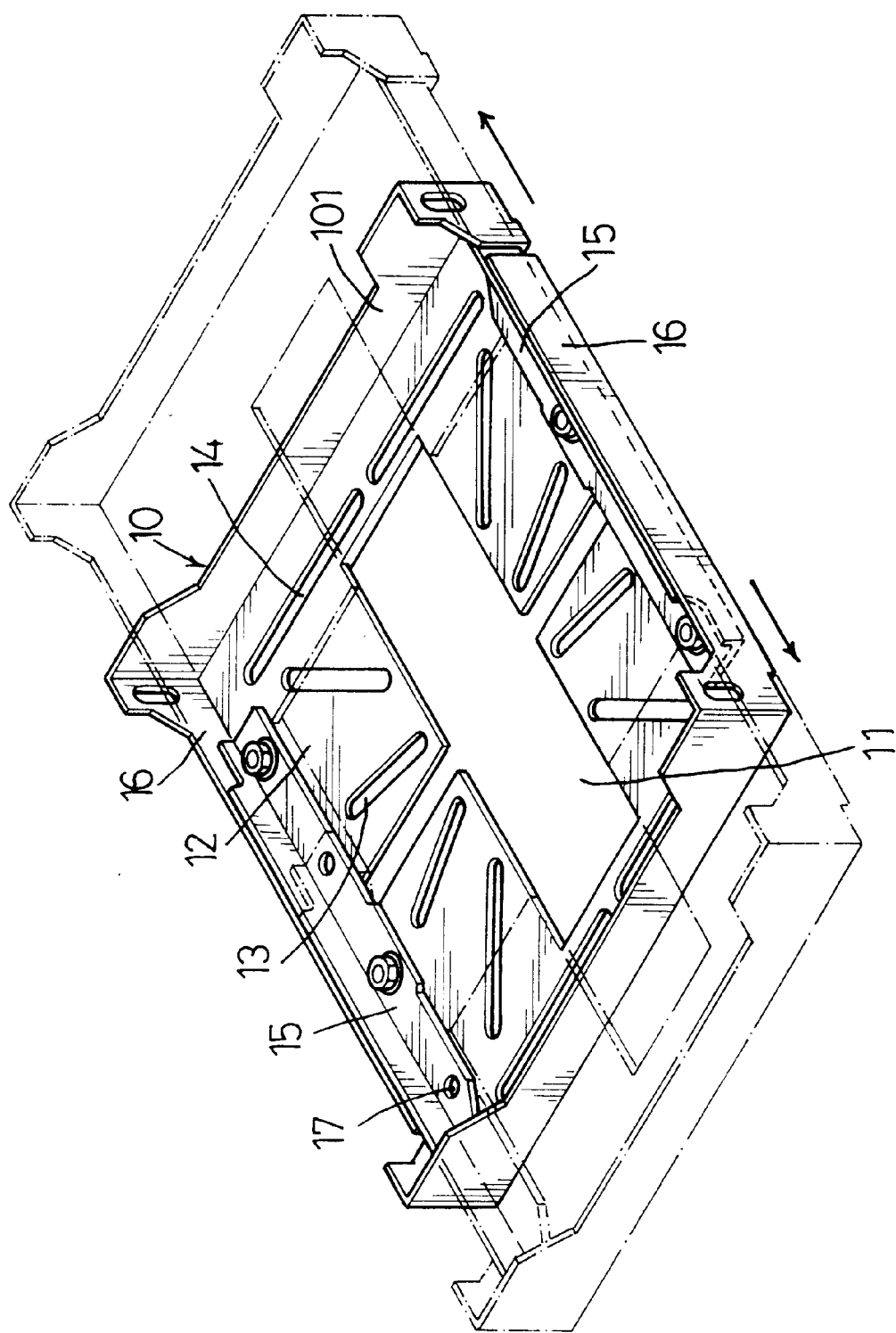
FIG. 3 is an operational perspective view of the adjustable mounting bracket for a power hand tool in FIG. 1, wherein the broken lines show how the mounting bracket is adjusted.

Referring to the drawings and initially to FIGS. 1 to 3, an adjustable mounting bracket for a power hand tool in accordance with the present invention comprises two U-shaped frames (10) juxtaposed to slide on each other and securely held together by nuts (22) and bolts (21). Each of the frames (10) includes an end plate (101) and an integral side plate (16) extending perpendicular from one end of the end plate (101). A shoe plate (12) extends perpendicular from the end plate (101) and the integral side plate (16). The shoe plate (12) is U-shaped with a first additional extending piece integrally connected to a lower edge of the end plate (101) and a second additional extending piece integrally connected to a lower edge of the integral side plate (16). An angled side plate (15) is attached perpendicular to the free end of the end plate (101) parallel to the integral side plate (16). The angled side plate (15) has a height lower than that of the integral side plate (16) such that when the angled side plate (15) slides in the inside face of the integral side plate (16) and the shoe plate (12), the edges of the angled side plate (15) and the integral side plate (16) are flush. When two frames (10) are connected, the open central area formed by the two shoe plates (12) constitutes a working space (11) through which the appropriate tool protrudes when the power hand tool is attached to the mounting bracket. At least one first slot (14) is defined in the first additional extending piece of the shoe plate (12) adjacent and parallel to the end plate (101). At least one second slot (18) is defined in the second additional extending piece of the shoe plate (12) adjacent and parallel to the integral side plate (16). Separated through holes (17) are defined in a line in the horizontal surface of the angled side plate (15). she separated holes (17) correspond to the second slots (18) parallel to the corresponding integral side plate (16) of the opposite frame (10). Multiple third slots (13) are radially defined in each of the shoe plates (12).

Figure 4:
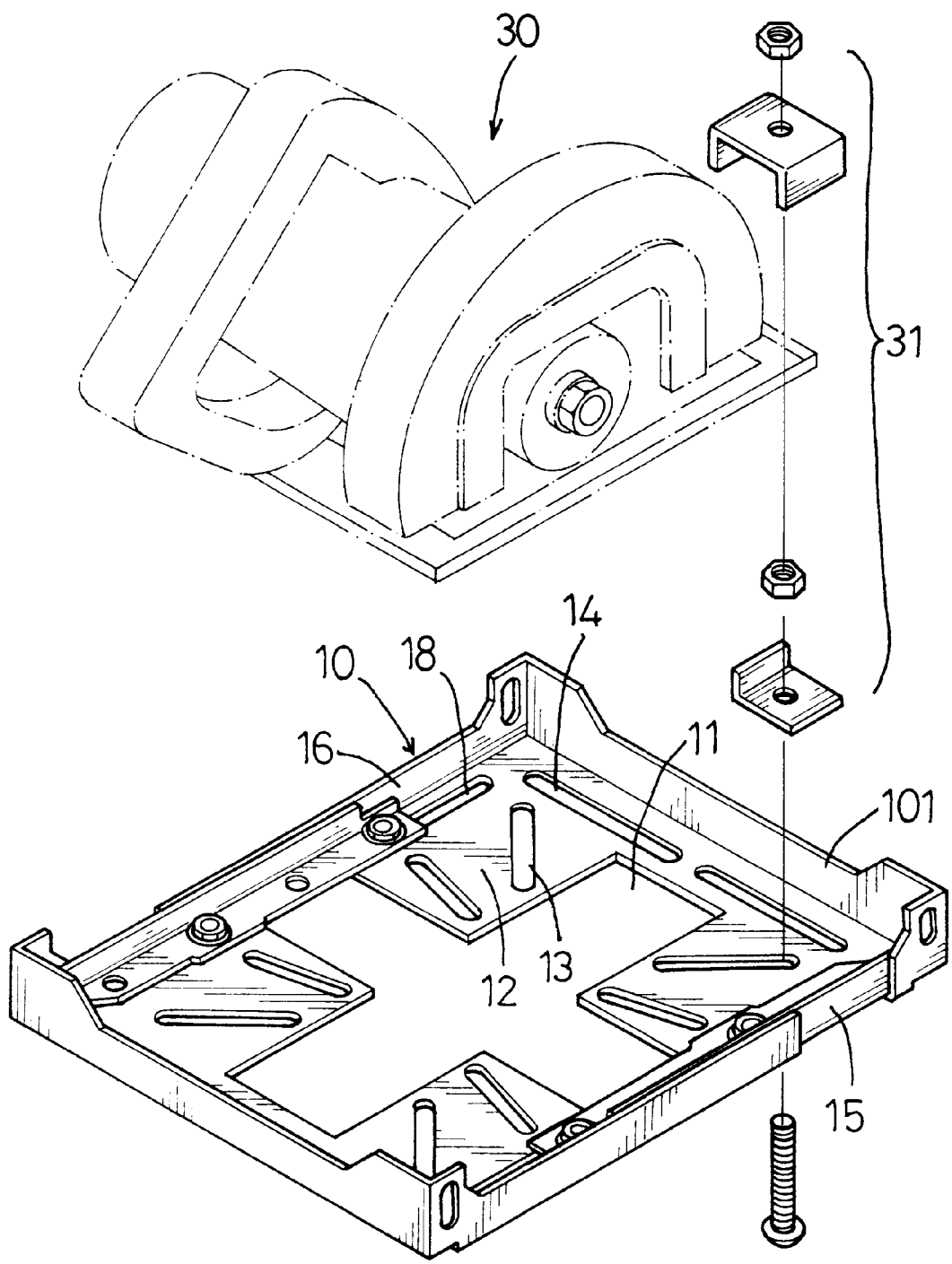
FIG. 4 is an operational perspective view of the adjustable mounting bracket for a power hand tool in FIG. 1, wherein a circular saw is attached to the mounting bracket.

With reference to the FIGS. 4 and 5, the adjustable mounting bracket for a power hand tool further comprises multiple first locking pieces (31) and multiple second locking pieces (41). These first locking pieces (31) clamp a circular saw shoe (30) to the shoe plates (12). These second locking pieces (41) clamp a router shoe (40) to the shoe plates (12).

To assemble the mounting bracket, the integral and angled side plates (15, 16) of two frames (10) can slide on each other and the shoe plate (12) to adjust the working space (11) and the slots (13, 14) to be a suitable size to securely attach a power hand tool (30, 40) to the shoe plates ( 12) by using appropriate locking pieces (31, 41) after loosening the nuts (22) and the bolts (21). When the power hand tool (30, 40) is secured on the shoe plates (12), the nuts (22) and bolts (21) are tightened to make the bracket and attached power hand tool (30, 40) rigid. With the power hand tool (30, 40) attached to the mounting bracket, the mounting bracket and the power hand tool (30, 40) can be attached to the bottom of an appropriate worktable.

As described above, the adjustable mounting bracket for a power hand tool in accordance with the present invention can be adjusted to suit for various power hand tools such as circular saws and routers. Consequently, the user only needs to adjust the mounting bracket to save both material and money. The two frames in accordance with the present invention are identical so any two frames can be used to form the mounting bracket and manufacturing is simplified.

Although the invention has been explained in relation to its preferred embodiment, it is to be understood that many other possible modifications and variations can be made without departing from the spirit and scope of the invention as hereinafter claimed.

What is claimed is:

1. An adjustable bracket for a power hand tool comprising:

two U-shaped frames juxtaposed to slide on each other and securely connected by nuts and bolt, each of said two frames including an end plate having a first end and a second end, an integral side plate extending perpendicular from said first end of said end plate and an angled side plate with a horizontal component attached to said second end of said end plate parallel to said integral side plate, said angled side plate having a height which is lower than that of said integral plate, and a U-shaped shoe plate extending perpendicular from said end plate and said integral side plate, said U-shaped shoe plate having a first additional extending piece integrally connected to a lower edge of said end plate and a second additional extending piece integrally connected to a lower edge of said integral side plate;

at least one first slot defined in said first additional extending piece of said shoe plate adjacent and parallel to said end plate;

at least one second slot defined in said second additional extending piece of said shoe plate adjacent and parallel to said integral side plate;

multiple third slots, radially defined in said shoe plate;

separated through holes defined in said horizontal component of said angled side plate and corresponding to said second slot adjacent to a corresponding integral side plate in an opposite frame;

a central working space formed within said two U-shaped frames when said two U-shaped frames are joined to each other; and multiple locking pieces adapted to secure a power hand tool on said two J-shaped frames.

* * * * *